United States Patent
Joffre et al.

(10) Patent No.: US 9,607,365 B1
(45) Date of Patent: Mar. 28, 2017

(54) SYSTEMS AND METHODS FOR ENHANCING QUALITY OF IMAGE MEDIA

(71) Applicant: HDRlog SARL, Montpellier (FR)

(72) Inventors: Jacques Joffre, Montpellier (FR); Mickael Pinto, Lodève (FR)

(73) Assignee: HDRlog SARL, Montpellier (FR)

( * ) Notice: Subject to any disclaimer, the term of this patent is extended or adjusted under 35 U.S.C. 154(b) by 0 days.

(21) Appl. No.: 15/338,503

(22) Filed: Oct. 31, 2016

(51) Int. Cl.
*G06T 5/50* (2006.01)
*G06T 5/00* (2006.01)

(52) U.S. Cl.
CPC ............. *G06T 5/007* (2013.01); *G06T 5/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,181,836 B1 * | 1/2001 | Delean | ...................... | G06T 3/00 345/428 |
| 6,292,593 B1 * | 9/2001 | Nako | ...................... | G06T 5/006 382/284 |
| 6,393,162 B1 * | 5/2002 | Higurashi | ............... | G06T 5/006 345/629 |
| 7,729,563 B2 * | 6/2010 | Kameyama | ........... | G06T 3/4053 382/284 |
| 8,078,010 B2 * | 12/2011 | Kameyama | ........... | G06T 3/4053 382/294 |
| 8,805,121 B2 * | 8/2014 | Kameyama | ........... | G06T 3/4053 382/299 |
| 8,861,893 B2 * | 10/2014 | Chen | ..................... | G06T 3/4053 348/14.02 |
| 8,878,950 B2 * | 11/2014 | Lelescu | .............. | H04N 13/0029 348/218.1 |
| 2004/0086193 A1 * | 5/2004 | Kameyama | ........... | G06T 3/4053 382/254 |
| 2004/0218828 A1 * | 11/2004 | Aiso | ........................ | G06T 3/40 382/254 |
| 2010/0195927 A1 * | 8/2010 | Kameyama | ........... | G06T 3/4053 382/260 |
| 2011/0255610 A1 * | 10/2011 | Kameyama | ........... | G06T 3/4053 375/240.26 |
| 2012/0189066 A1 * | 7/2012 | Kameyama | ........... | G06T 3/4053 375/240.26 |
| 2015/0104116 A1 * | 4/2015 | Salvador | ............... | G06T 3/4053 382/300 |

* cited by examiner

*Primary Examiner* — Anand Bhatnagar

(57) ABSTRACT

The invention provides median image media quality enhancer. The image media is fed into a computing device which is essentially a burst of images or video to be enhanced. Each frame within the image media is identically exposed and hence neighboring images are used to enhance quality of the image media. For each of the neighboring frames, each pixel of these neighboring frame is moved in order to correspond to the image media. Once all the neighboring frames are processed, these are stacked in order to increase signal to noise ratio to create a composite image. This reduces unwanted spots and luminosity fluctuation from the digitized video.

15 Claims, 3 Drawing Sheets

SYSTEMS AND METHODS FOR ENHANCING QUALITY OF IMAGE MEDIA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD

The present disclosure relates to image processing, more particularly the disclosure relates to enhancing the quality of images or videos while restoration from digitization.

BACKGROUND

Digitization of images and especially old movies is a relatively new concept. However, with the advent of new and better resolution display devices technology, there has been an upsurge in techniques of digitization of old movies in order to keep the memory of ancient artworks. This is for making these ancient artworks available for the today's and tomorrow' viewers with best resolution viewing formats. There are some specialized companies that digitize old movies and make them available for current technology viewing equipment in compatible formats. After digitization, these movies are then further processed to restoration in order to improve the overall quality of the video. Restoration step helps to crop out black borders, reduces noise, removes dust spots, reduces luminosity fluctuation and more. This is generally followed by a color grading step that helps to alter and enhance color of the video. This can be done either electronically, photo-chemically or digitally. The photo-chemical process is also referred to as color timing and is typically performed at a photographic laboratory.

Although multiple software are available like Da Vinci Resolve and many other that help to improve the restoration of digitized video files. However, there are certain problems like usage, handling and ease of use of the software. Also, these software are complex to use and require expertise.

Therefore, there is a need for an improved solution for restoration of digitized video files.

SUMMARY

In an embodiment of the invention, there is provided a method for enhancing quality of image media. The method includes acquiring by a processor, the image media, wherein the image media includes a plurality of image frames. Further, the processor identifies an image frame, from the plurality of image frames whose quality is to be enhanced. The method further, includes isolating a plurality of neighboring frames by the processor, wherein the plurality of neighboring frames has similar properties. Further, the processor forms processed neighboring frames, by moving each pixel of each of the neighboring frame from the plurality of neighboring images to correspond to the image media. Further, this step is repeated for all of the plurality of neighboring frames. These processed frames are stacked and a composite image of enhanced quality is generated.

In another embodiment of the invention, there is provided a system for enhancing the quality of image media. The system comprises a processor, and a computer readable medium which when executed by the processor causes the processor to perform a method. The method includes acquiring by a processor, the image media, wherein the image media includes a plurality of image frames. The method further, includes isolating a plurality of neighboring frames by the processor, wherein the plurality of neighboring frames has similar properties. Further, the processor forms processed neighboring frames, by moving each pixel of each of the neighboring frame from the plurality of neighboring frames to correspond to the image media. Further, this step is repeated for all of the plurality of neighboring frames. These processed frames are stacked and a composite image of enhanced quality is generated.

In yet another embodiment of the invention, there is provided a non-transitory computer readable storage medium for enhancing quality of image media, when executed by a computing device, causes the computing device to perform a method. The method includes acquiring by a processor, the image media, wherein the image media includes a plurality of image frames. Moreover, the method includes isolating a plurality of neighboring frames by the processor, wherein the plurality of neighboring frames has similar properties. Further, the processor forms processed neighboring frames, by moving each pixel of each of the neighboring frame from the plurality of neighboring frame to correspond to the image media. Further, this step is repeated for all of the plurality of neighboring frames. These processed frames are stacked and a composite image of enhanced quality is generated.

Additional features and advantages are realized through the techniques of the present disclosure. Other embodiments and aspects of the present disclosure are described in detail herein and are considered a part of the present disclosure. For a better understand ing of the present disclosure with advantages and features, refer to the description and to the drawings.

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

This application is related to an FR patent number FR2996034 BI that has been incorporated by reference in its entirety for all purposes.

Figure 1:
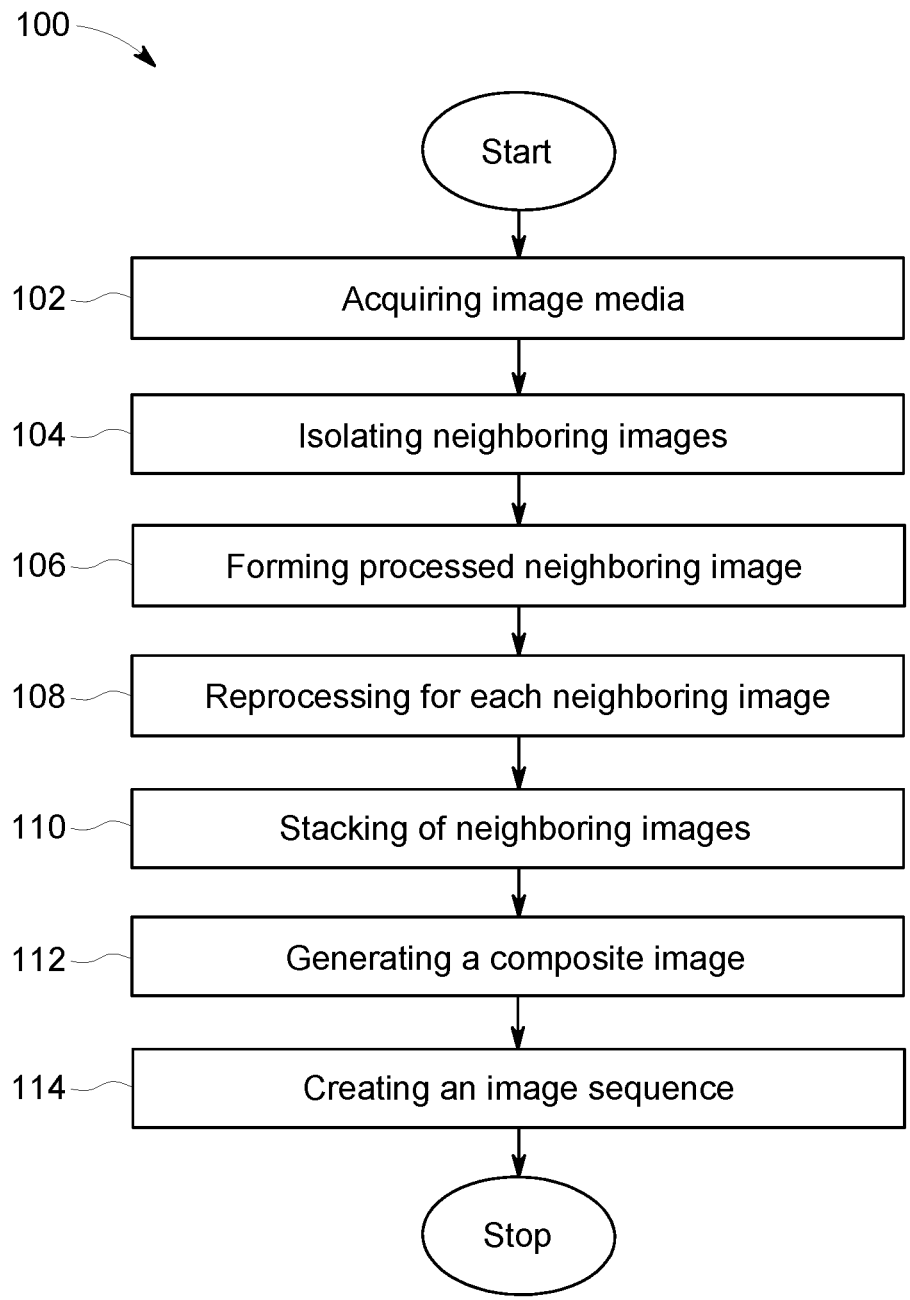
FIG. 1 illustrates a flow chart depicting a method to enhance image quality, in accordance to an embodiment of the invention.

Referring now to FIG. 1, a flow chart of a method 100 for enhancing quality of an image media is illustrated, in accordance with an embodiment of the invention. Image media can be a video or burst images. The image media is storable in a digital file in a conventional picture or video encoding format such as e.g. RAW, JPEG or PNG, AVI, MOV, etc. Further, this image media is also displayable on conventional and new age displays such as a display screen.

At step 102, image media is acquired by a processor to initiate enhancement of the image media. The image media acquired can be previously stored as digital files, or from an imaging sensor. However, preferably, the image media includes images that can be stored in digital files in a conventional picture encoding format such as e.g. RAW, JPEG or PNG, AVI, MOV, etc. Also, such image media can also be displayed on a conventional display device such as a screen. The image media may also be encoded in 8 bits, or 16 bits per color. Also, the enhanced version of the image media will also be encoded in same format as the image media. Hence, the image media and the enhanced version are coded pictures on a comparable number of color intensity levels. The image media includes a plurality of image frames.

Further, at step 104, a plurality of neighboring frames within the image media identified are isolated or identified by the processor. Exposure level of a frame is a function of the amount of light or light energy received at the imaging sensor, for an incident light intensity on the given optical imaging system. This exposure level depends in particular the opening of the imaging device and the exposure time of the sensor.

As a general practice in photography, the exposure level is expressed in indices EV IL, i.e. 'Exposure Value' Ev. A+/−1 Ev (or +/−1 EV) of the exposure level corresponds respectively to a making half or double of the amount of light incident on the imaging sensor (for a light intensity incident on the optical system data imaging). It is preferable that the neighboring images to be as similar as possible. Neighboring images can be acquired for e.g. in burst mode or continuous acquisition mode with a digital camera, in a very short time interval. There are various devices available in the market that can acquire up to 60 frames per second or even more, and/or create videos at 24 or 60 frames/s. This allows to acquire images with short exposure time (1/1000 for instance), and so it helps in minimizing blur due to movements.

At step 106, a processed neighboring image is formed. For this step, each pixel of the neighboring image out of the plurality of neighboring images is moved. The movement of pixels is so as to correspond completely to the image media identified to be enhanced. Thereafter at step 108, the previous process of step 106 is re-executed for all the plurality of identified neighboring frames. Hence forming a set of processed neighboring frames.

Further, at step 110, all the processed neighboring frames, are stacked up together to generate a composite image at a further step 112. This composite image is the enhanced version of the image media. The composite image is on the same format as the acquired image media. Summation of each pixel of the neighboring frames is performed. This summation generates a noise only due to the addition of each pixel noise and no additional noise are created as a result of the summation. It follows that the signal to noise ratio of N neighboring frames SNRc(X,Y) in each pixel of the composite image obtained by combination of N neighboring frames is equal to: $SNRc(X,Y)=N/\sqrt{(N)} \times SNR(X,Y)$, where $SNR(X,Y)$ is the signal to noise ratio of the pixel in the neighboring frames in the image media. In other words, by normalizing the intensity levels, there is a net reduction of the noise level by a factor of a square root of N ($1/\sqrt{(N)}$). The improved signal to noise ratio improves representation of the scene in low-risk areas of the composite image, compared to the image media. It also lowers the exposure limit at which an object is detected in the composite image, which limit being about SNRc=1.

Therefore, an object can be detectable in the composite image, whereas in the image media the object is not clearly detected because it is buried in noise. This process of digital summation of N processed neighboring frames generates, for low lights, a result comparable with that, which would produce an increase by a factor of N exposure level on the imaging sensor in the acquisition of image media, albeit with significant advantages:—the motion sensitivity is less, since acquisitions can be done with short exposure time and the neighboring frames are readjusted before to be combined, there is no saturation effects in the highlights because there is no coding dynamic problems. In practice, using a number N (for example lets take N=10) of neighboring images, a composite image is obtained with a noise level reduced by a factor $1/\sqrt{(N)}$ (approximatively 3 in this case when N=10). Further at step 114, an image sequences is created using the enhanced composite images.

Figure 2:
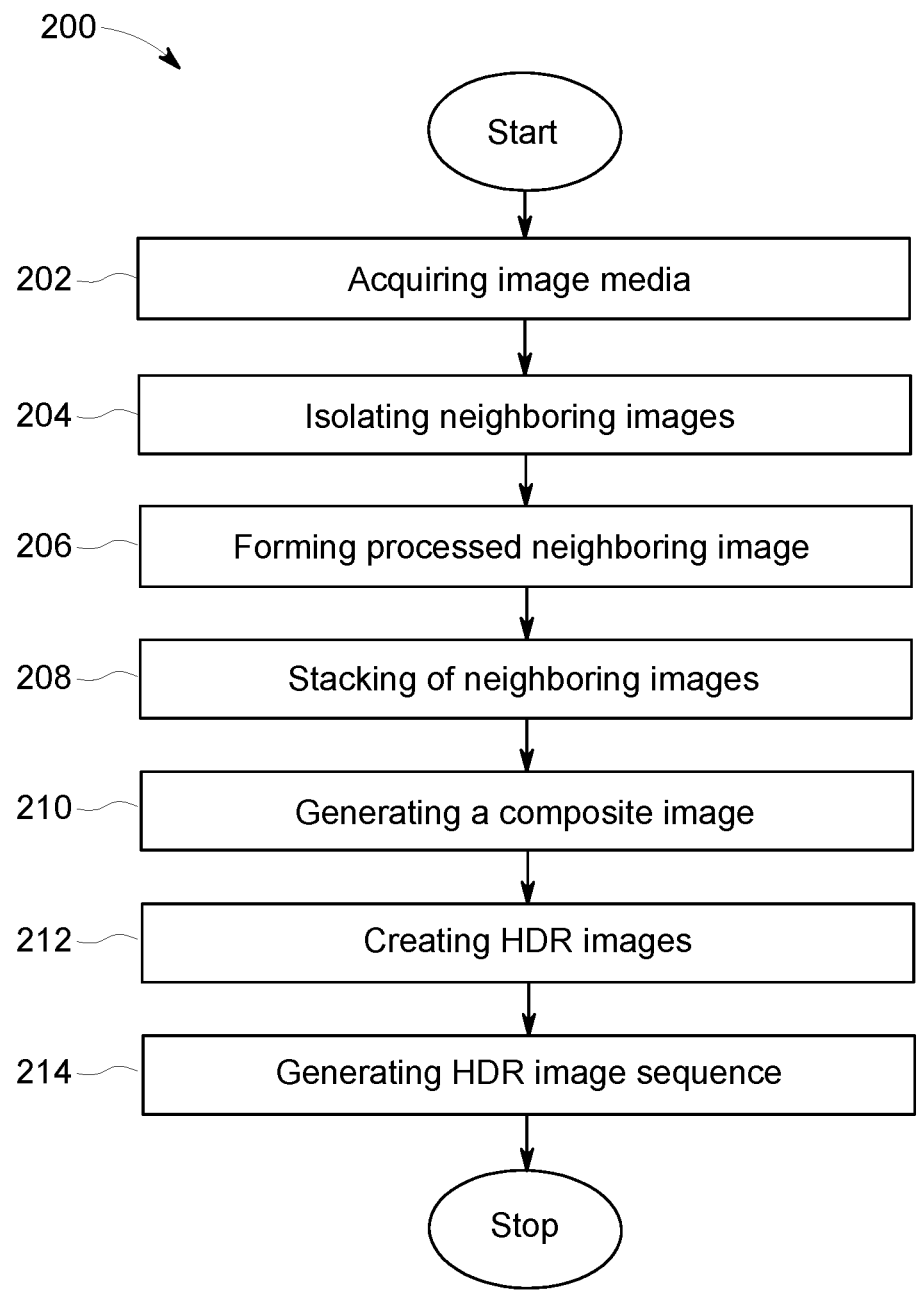
FIG. 2 illustrates a flow chart depicting a method to enhance image quality, in accordance to another embodiment of the invention.

Referring now to FIG. 2, a flow chart of a method 200 to enhance image quality is illustrated, in accordance with another embodiment of the invention. At step 202 image media is acquired by a processor. Details of this step have been described earlier in conjunction to FIG. 1.

Thereafter, at step 204, the processor performs isolation of neighboring frames. Details of the step have been described above in conjunction with FIG. 1 At step 206, forms processed neighboring frames. The processed neighboring frames are formed by moving entire pixel map or all the neighboring frames in order to correspond to the image media to be enhanced. Each pixel of the neighboring frame is moved to correspond to the image media. The image media acquired, thereafter at step 204, undergoes an identification, wherein the processor further identifies an image sequence within the image media that needs to be enhanced. This is done by determining and comparing moisture, dust spots and pixels within the image sequence.

Thereafter, at step 208, stacking of these processed neighboring frames takes place. The changed pixel map of each processed neighboring frames is placed one over the other in order to produce an enhanced or composite image. Summation of each pixel of the neighboring frames is performed. The summation generates a noise only due to the addition of each pixel noise and no additional noise are created as a result of the summation. It follows that the signal to noise ratio of N neighboring frames $SNRc(X,Y)$ in each pixel of the composite image obtained by combination of neighboring frames is equal to: $SNRc(X,Y)=N/\sqrt{(N)}\times SNR(X,Y)$, where $SNR(X,Y)$ is the signal to noise ratio of the pixel in the neighboring frames in the image media pixel. In other words, by normalizing the intensity levels, there is a net reduction of the noise level by a factor of a square root of N ($1/\sqrt{(N)}$). The improved signal to noise ratio improves representation of the scene in low-risk areas of the composite image, compared to the image media. It also lowers the exposure limit at which an object is detected in the composite image, which limit being about SNRc=1.

Thereafter, at step 210, an enhanced composite image is formed. This composite image has very less noise level. Therefore, an object can be detectable in the composite image whereas, in the image media the object is not clearly detected because it is buried in noise. This process of digital summation of N processed neighboring frames generates for low lights, a result comparable with that, which would produce an increase by a factor of N exposure level on the imaging sensor in the acquisition of image media, albeit with significant advantages:—the motion sensitivity is less, since acquisitions can be done with short exposure time and the neighboring frames are readjusted before to be combined, there is no saturation effects in the highlights because there is no coding dynamic problems. In practice, using a number N (for example lets take N=10) of neighboring frames, and a composite image is obtained with a noise level reduced by a factor $1/\sqrt{(N)}$ (approximatively 3 in this case when N=10).

Method 200, further involves a step 212, wherein high dynamic range (HDR) images of the composite image are processed. The composite image as obtained at step 210 includes all the useful information in areas of low, medium and high exposure. However, the composite image is coded high dynamics that is for e.g. 32 bits so as to be directly displayed on a display device with both the shadowed areas and highlight areas distinctly reproduced. Therefore, an HDR image, that can be stored in a digital file with a classic encoding format that is 8 or 16 bits per color. Whereas correct representation of areas of high and low lights is allowed.

According to embodiment of the invention, multiple composite images correspond to images of different exposure levels. It recreates images as they would have been obtained by varying the exposure. For example:—to reproduce the equivalent of shooting with levels of one show +1, 0, −1 Ev, it must generate three composite images with at least 1, 2, and 4 neighboring frames to obtain the equivalent of shooting with exposure levels of +2, 0, −2 Ev, it must generate three composite images with at least 1, 4 and 16 images. The composite images are then normalized on a dynamic of MI levels corresponding to the dynamics of the HDR image.

This standardization is carried out to reproduce the sensor saturation process:—the pixels of the composite image whose intensity level is lower than the peak intensity levels M, retain their value, the pixels of the composite images, whose intensity level is higher than the maximum level of intensity M, take the maximum level of intensity M. If the composite image of lower dynamic is generated from 5 to more than a picture of acquisition, intensity levels are also normalized accordingly. The HDR image is then generated by using an exposure fusion technique ('exposure blending'):—the light areas corresponding to areas of low lights of the scene are taken from the composite image with the highest level of exposure, and the light areas corresponding to areas of medium stage lights are extracted from the composite image with the average level of exposure, the light areas corresponding to highlight areas of the scene are taken from the composite image with the level of the lowest exposure, that is to say one that is generated with one image acquisition. The extractions of the light areas are based on the levels of intensity of the pixels that compose them. The light areas corresponding to zones of low, medium and high lights are then combined to generate the HDR image.

Thereafter, at step 214, all HDR images processed are patched together to form a sequence of images may be in burst mode or in a video.

Figure 3:
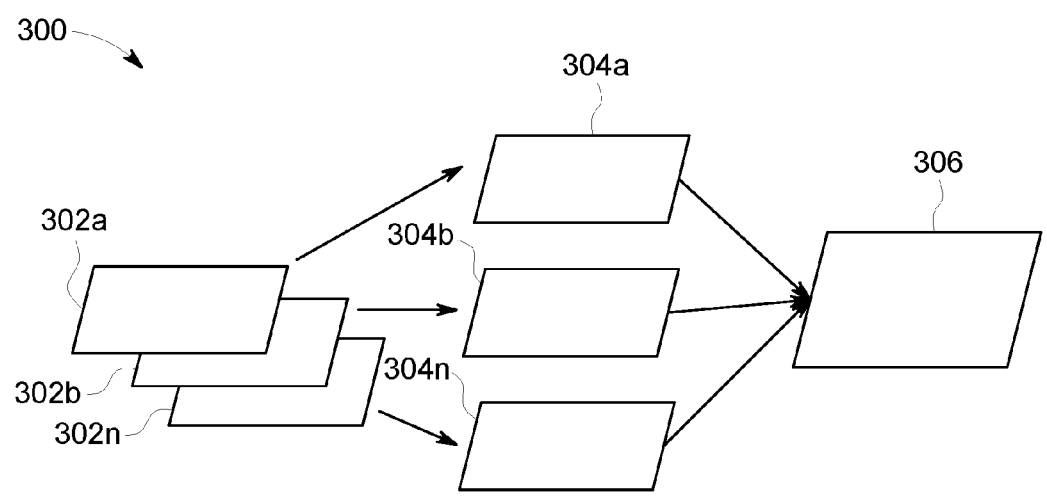
FIG. 3 illustrates a block diagram to enhance image media quality, in accordance with an embodiment of the invention.

Referring now to FIG. 3, a block diagram of an image media 300 is illustrated, in accordance to an embodiment of the invention. Image media 300, as displayed, includes multiple neighboring frames 302*a*-302*n* which will be collectively named as neighboring frames 302. These neighboring frames have similar properties. These properties include exposure levels. So all the neighboring frames are of similar exposure. These neighboring frames 302 are then processed, wherein each and every pixel of the neighboring frames 302 are moved so that they correspond to the image media 300. The processed neighboring frames 304*a*-304*n* are then stacked together as displayed in FIG. 3 to obtain a final enhanced composite image 306. In further steps, these composite images 306 can be further processed to obtain HDR images or videos.

Aspects of the present subject matter are described herein with reference to flowchart illustrations and/or block diagrams of methods and apparatus (systems) according to embodiments of the subject matter. It will be understood that each block of the flowchart illustrations and % or block diagrams, and combinations of blocks in the flowchart illustrations and/or block diagrams, can be implemented by computer readable program instructions.

While there has been shown and described herein what are presently considered the preferred embodiments of the present disclosure, it will be apparent to those skilled in the art that various changes and modifications can be made therein without departing from the scope of the present disclosure as defined by the appended claims.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure. The accompanying claims and their equivalents are intended to cover such forms or modifications as would fall within the scope and spirit of the present disclosure.

What is claimed is:

1. A method of enhancing quality of an image media, comprising:
   acquiring, by a processor, the image media, wherein the image media comprises a plurality of image frames;
   identifying, by the processor, an image frame from the plurality of image frames whose quality is to be enhanced;
   isolating, by the processor, a plurality of neighboring frames within the image media, wherein each neighboring frame among the plurality of neighboring frames have similar properties;
   forming a processed neighboring frame, by the processor, by moving each pixel of each neighboring frame among the plurality of neighboring frames to correspond to the image media;
   reprocessing, by the processor, by moving pixels in each neighboring frame among the plurality of neighboring frames to form a plurality of processed neighboring frames;
   stacking, by the processor, the plurality of processed neighboring frames; and
   generating a composite image of enhanced quality.

2. The method of claim 1, wherein the image media is a picture, or a film.

3. The method of claim 1, wherein the image media is a sequence of burst images.

4. The method of claim 1, wherein the image media is a video.

5. The method of claim 1, wherein the method further includes identifying fault areas in the processed neighboring frame.

6. The method of claim 1, wherein the similar properties include substantially identical exposure.

7. The method of claim 1, wherein the method further includes summing of pixels corresponding to each of the plurality of processed neighboring frames.

8. The method of claim 1, wherein the method further includes creating high dynamic range (HDR) images from the composite image of enhanced quality.

9. The method of claim 8, wherein the method further includes creating a sequence of HDR images.

10. A system for enhancing quality of image media comprising:
    a processor; and
    a computer readable medium, when executed by the processor causes the processor to perform a method comprising;
    acquiring, an image media, wherein the image media comprises a plurality of image frames;
    identifying, an image frame from the plurality of image frames whose quality is to be enhanced;
    isolating, a plurality of neighboring frames within the image media, wherein each neighboring frame among the plurality of neighboring frames have similar properties;
    forming a processed neighboring frame, by the processor, by moving each pixel of each neighboring frame among the plurality of neighboring frames to correspond to the image media;
    reprocessing, by moving pixels in each neighboring frame among the plurality of neighboring frames to form a plurality of processed neighboring frames;
    stacking, the plurality of processed neighboring frames; and
    generating a composite image of enhanced quality.

11. The system of claim 10, wherein the image media is captured using an image sensor.

12. The system of claim 10, wherein the image media is a video.

13. The system of claim 10, wherein the method further includes creating high dynamic range (HDR) images of each of the processed neighboring frame.

14. The system of claim 13, wherein the method further includes creating an HDR video by utilizing the high dynamic range (HDR) images of the processed neighboring frames.

15. A non-transitory computer readable storage medium enhancing quality of image media, when executed by a computing device, causes the computing device to:
    acquiring, an image media, wherein the image media comprises a plurality of image frames;
    identifying, an image frame from the plurality of image frames whose quality is to be enhanced;
    isolating, a plurality of neighboring frames within the image media, wherein each neighboring frame among the plurality of neighboring frames have similar properties;
    forming a processed neighboring frame, by a processor, by moving each pixel of each neighboring frame among the plurality of neighboring frames to correspond to the image media;
    reprocessing, by moving pixels in each neighboring frame among the plurality of neighboring frames to form a plurality of processed neighboring frames;
    stacking, the plurality of processed neighboring frames; and
    generating a composite image of enhanced quality.

* * * * *